US008881103B2

(12) United States Patent
Bak et al.

(10) Patent No.: US 8,881,103 B2
(45) Date of Patent: Nov. 4, 2014

(54) COMPARING COMPONENT WEIGHTS BETWEEN BUILDS

(75) Inventors: Nathan V Bak, Portland, OR (US); Eric B Munson, Hillsboro, OR (US); Ramachandra N Pai, Beaverton, OR (US); Timothy C Pepper, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 13/210,258

(22) Filed: Aug. 15, 2011

(65) Prior Publication Data

US 2013/0047137 A1    Feb. 21, 2013

(51) Int. Cl.
*G06F 9/44*        (2006.01)

(52) U.S. Cl.
CPC ... *G06F 8/71* (2013.01); *G06F 8/77* (2013.01)
USPC ......................................................... 717/121

(58) Field of Classification Search
CPC ........................................................ G06F 8/00
USPC .................. 717/101–105, 120–122, 168–173
See application file for complete search history.

(56) References Cited

U.S. PATENT DOCUMENTS

| 2009/0133006 A1 | 5/2009 | Cheung |
| 2009/0150887 A1 | 6/2009 | Sanghvi et al. |
| 2009/0216782 A1 | 8/2009 | Szyperski et al. |
| 2010/0153908 A1 | 6/2010 | Sarkar et al. |

OTHER PUBLICATIONS

Software Technology Support Center Cost Analysis Group, "Software Development Cost Estimating Guidebook", Jul. 2009, retrieved from https://acc.dau.mil/adl/en-US/382675/file/51491/SoftwareGuidebook%5B1%5D.pdf, 254 pages.*
Visaggio, "Value-based Decision Model for Renewal Processes in Software Maintenance", 2000, Annals of Software Engineering Journal, vol. 9, Issue 1-4, 16 pages.*

* cited by examiner

*Primary Examiner* — Ted T Vo
(74) *Attorney, Agent, or Firm* — Marcia L. Doubet (57) ABSTRACT

A computer system, program, or method may provide for quantifying changes in an individual component among a plurality of components in a software development environment where the components are incorporated in a build. This may include calculating a baseline weight of the individual component prior to a change; effecting, in the software development environment, the change to the individual component; calculating a modified weight of the individual component after the change; determining a threshold for a difference between the baseline weight and the modified weight of the individual component; calculating the difference between the baseline weight and the modified weight of the individual component; and providing on the software development computer a notification if the difference exceeds the threshold. The weights of the individual component may use data such as a count of other components required by the individual component, an install size, a runtime memory usage, a depth of a dependency tree, a component license type, a component category for memory location, a component code type, and/or other types of data.

12 Claims, 4 Drawing Sheets

COMPARING COMPONENT WEIGHTS BETWEEN BUILDS

BACKGROUND

The present invention relates generally to a computer system, program, and method for use by a software developer in revising one or more components in multi-component software builds where the software developer incorporates the components in successive builds. More specifically the present invention relates to gauging one or more effects of revising the component(s) and notifying the developer of the effect(s).

In any programming or software development environment, the software being developed may incorporate a large number of modules or components. Such a software development environment typically includes a range of resources for developing a software product, including tools for building and packaging the product. The software product may be more broadly divided between client and server portions. Such component-based products encourage sharing and reuse of code, which tends to promote efficiency in software development. At the same time, the components within and across each of the client and the server typically have multiple inter-relationships and characteristics that affect the performance and other parameters of the software. As the developer creates new components and modifies existing components these characteristics and interrelationships change, sometimes in unexpected manners. For example, components that are not necessary in a build might nonetheless be installed. This may be mitigated through careful planning and a well-defined architecture, but even then component changes may have consequences not predicted by the planning or architecture.

Such component changes may be understood to increase a weight of the component, where the weight is a measure of resources that are requested in order for the component to operate as planned. For example, a software product being developed may be made up of both client and server portions. A developer working on the client side may make a single change to use a method in a component that had not previously been part of the product. As a result, that component is now added as a new dependency. A possible outcome is that, in order for the client to have full functionality, a substantial part of the server portion may need to be installed on the client, increasing the client install size by an amount that outweighs the value of having such method in the new component. Here, the weight of the component may be measured in terms of the extent of its dependencies.

As another example, a Linux user may want to remove a driver, such as a wireless driver, that the user expects not to use for the application at hand. The package manager may indicate that, in order to remove the driver, the entire Linux kernel must also be removed. This effectively makes the wireless driver a requirement even if it will not be used.

Another possible situation is one where a change is made to a component to use a particular open source component. Typically, a requirement of open source components is that any consumers must also be willing to provide source code. Thus, in this situation, a product originally intended to be closed source may now have requirements relating to open source code, which may be incompatible with the plans for use of the software into which the component is incorporated. Here the weight of the component may be measured in terms of the license types required for its planned operation. For these and other examples, it is preferable to provide an early analysis and notification of the potential effects of component change.

BRIEF SUMMARY

According to one embodiment of the present invention, changes in one or more individual components among a plurality of components may be quantified and the developer notified if one or more of the changes exceed a threshold for such changes. Typically the developer is incorporating the components in a build in a software development environment and at least a portion of the components and the software development environment reside on a software development computer.

An embodiment of the present invention focused on one change in one component may calculate a baseline weight of the individual component prior to a change. The software developer may effect the change to the individual component, which is typically followed by a calculation of a modified weight of the individual component after the change. A threshold may be determined for a difference between the baseline weight and the modified weight of the individual component, and the difference may be calculated. If the difference exceeds the threshold, a notification may be provided on the software development computer.

Calculating the baseline weight and the modified weight of the individual component may use one or more of the following variables associated with the component: (1) a count of other components, within the plurality of components, that are required by the individual component, (2) an install size, (3) a runtime memory usage, (4) a depth of a dependency tree, (5) a component license type, (6) a component category for memory location, (7) a component code type, and/or other data as suited to the particular components involved. The install size or build size may be an individual build size for the individual component, a build size for each other component on which the individual component depends, and/or a total build size calculated therefrom. The runtime memory usage may be an individual runtime memory usage for the individual component, a runtime memory usage for each other component on which the individual component depends, and/or a total runtime memory usage calculated therefrom.

According to an embodiment of the present invention, a computer system may include a software development environment operating thereon and a plurality of components accessible within the software development environment. The plurality of components may further include an individual component depending upon at least one other component in the plurality of components. The software development environment may include one or more tools configured to do the following:

1. to calculate a baseline weight of the individual component prior to a change and to calculate a modified weight of the individual component after the change.
2. to determine a threshold for a difference between the baseline weight and the modified weight of the individual component.
3. to calculate the difference between the baseline weight and the modified weight of the individual component.
4. to provide a notification if the difference exceeds the threshold.

According to another embodiment of the present invention, a computer program product for developing software on a computer system may include a computer usable medium having computer usable code embodied therewith. The computer usable code may include computer usable program code for performing one or more of the following actions:

calculating a baseline weight of the individual component prior to a change;

effecting the change to the individual component;

calculating a modified weight of the individual component after the change;

determining a threshold for a difference between the baseline weight and the modified weight of the individual component;

calculating the difference between the baseline weight and the modified weight of the individual component;

providing on the software development computer a notification if the difference exceeds the threshold.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
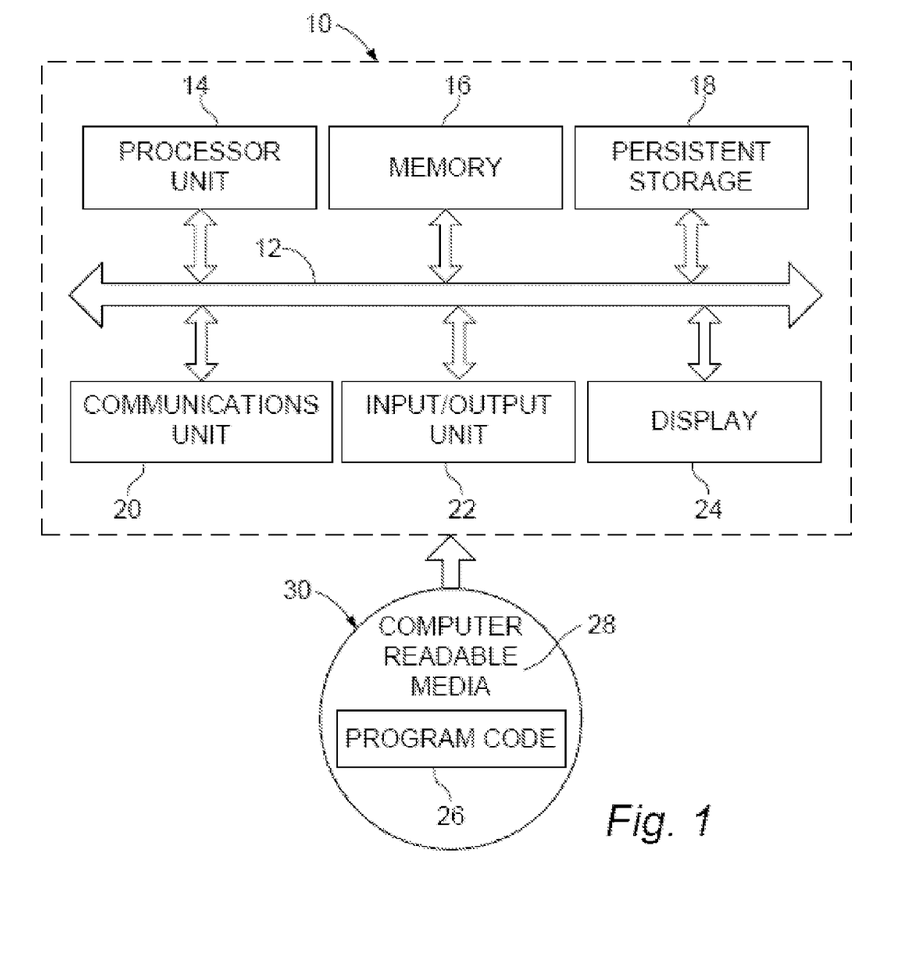
FIG. 1 is a block diagram of a computer system suitable for embodiments of the present disclosure.

With reference now to FIG. 1, a block diagram of a data processing system is shown in which illustrative embodiments may be implemented. Data processing system 10 is an example of a computer, such as a server, in which computer-usable program code or instructions implementing the processes may be located for the illustrative embodiments. Data processing system 10 may be a single computer or a distributed network of computers. In this illustrative example, data processing system 10 includes communication lines 12, which provides communication between a processor unit 14, a memory 16, a persistent storage 18, a communications unit 20, an input/output (I/O) unit 22, and a display 24.

Processor unit 14 serves to execute instructions for software that may be loaded into memory 16. Processor unit 14 may be a set of one or more processors or may be a multi-processor core, depending on the particular implementation. Further, processor unit 14 may be implemented using one or more heterogeneous processor systems in which a main processor is present with secondary processors on a single chip. As another illustrative example, processor unit 14 may be a symmetric multi-processor system containing multiple processors of the same type.

Memory 16 and persistent storage 18 are examples of storage devices. A storage device is any piece of hardware that is capable of storing information either on a temporary basis and/or a permanent basis. Memory 16, in these examples, may be, for example, a random access memory or any other suitable volatile or non-volatile storage device. Persistent storage 18 may take various forms depending on the particular implementation. For example, persistent storage 18 may contain one or more components or devices. For example, persistent storage 18 may be a hard drive, a flash memory, a rewritable optical disk, a rewritable magnetic tape, or some combination of the above. The media used by persistent storage 18 also may be removable. For example, a removable hard drive may be used for persistent storage 18.

Communications unit 20, in these examples, provides for communications with other data processing systems or devices. In these examples, communications unit 20 is a network interface card. Communications unit 20 may provide communications through the use of either or both physical and wireless communications links.

Input/output unit 22 may allow for input and output of data with other devices that may be connected to data processing system 10. For example, input/output unit 22 may provide a connection for user input through a keyboard and mouse. Further, input/output unit 22 may send output to a printer. Display 24 may provide a mechanism to display information to a user.

Instructions for the operating system and applications or programs may be located on persistent storage 18. These instructions may be loaded into memory 16 for execution by processor unit 14. The processes of the different embodiments may be performed by processor unit 14 using computer implemented instructions, which may be located in a memory, such as memory 16. These instructions may also be referred to generally as program code 26, including computer-usable program code or computer-readable program code that may be read and executed by a processor in processor unit 14. The program code 26 in different embodiments may be embodied on different physical or tangible computer-readable media, such as memory 16 or persistent storage 18.

In some examples, program code 26 may be located in a functional form on a computer-readable media 28 that may be selectively removable and may be loaded onto or transferred to data processing system 10 for execution by processor unit 14. Program code 26 and computer-readable media 28 may form a computer program product 30 in these examples. In some examples, computer-readable media 28 may be in a tangible form, such as, for example, an optical or magnetic disc that is resident in, or inserted or placed into a drive or other device that is part of persistent storage 18. Program code on computer readable media 28 may be transferred onto a storage device, such as a hard drive that is part of persistent storage 18. In a tangible form, computer-readable media 28 may take the form of a persistent storage, such as a hard drive, a thumb drive, or a flash memory that is connected to data processing system 10. The tangible form of computer-readable media 28 may also be referred to as computer-recordable storage media. In some instances, computer-recordable media 28 may not be removable, such as the media in a hard drive or solid-state memory.

Alternatively, program code 26 may be transferred to data processing system 10 from computer-readable media 28 through a communications link to communications unit 20 and/or through a connection to input/output unit 22. The communications link and/or the connection may be physical or wireless in the illustrative examples. The computer-readable media also may take the form of non-tangible media, such as communications links or wireless transmissions containing the program code. The different components illustrated for data processing system 10 are not meant to provide architectural limitations to the manner in which different embodiments may be implemented. The different illustrative embodiments may be implemented in a data processing system including components in addition to or in place of those illustrated for data processing system 10. Other components shown in FIG. 1 can be varied from the illustrative examples shown. As one example, a storage device in data processing system 10 may be any hardware apparatus that may store data. Memory 16, persistent storage 18, and computer-readable media 28 are examples of storage devices in a tangible form.

In another example, a bus system may be used to implement communication lines 12 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 16 or a cache such as found in an interface and memory controller hub that may be present in communication lines 12.

As noted above, data processing system 10 may be a single computer or a distributed network of computers, and in either case a software development environment 40 (FIG. 2) may be provided on data processing system 10 where a software developer may write programs for a particular application, typically using the precepts of component-based software engineering. The software developer may create a software package 50 intended to carry out the functions of the application. The software developer, which may be a team of individual programmers, typically engages in developing, testing, debugging, revising, improving, and/or otherwise changing components for the software package, and in doing so may perform successive component-based builds of the software package. A component-based build ordinarily compiles and packages components as well as any metadata related to the components, which metadata may be selected or filtered as appropriate for the particular build and application.

Figure 2:
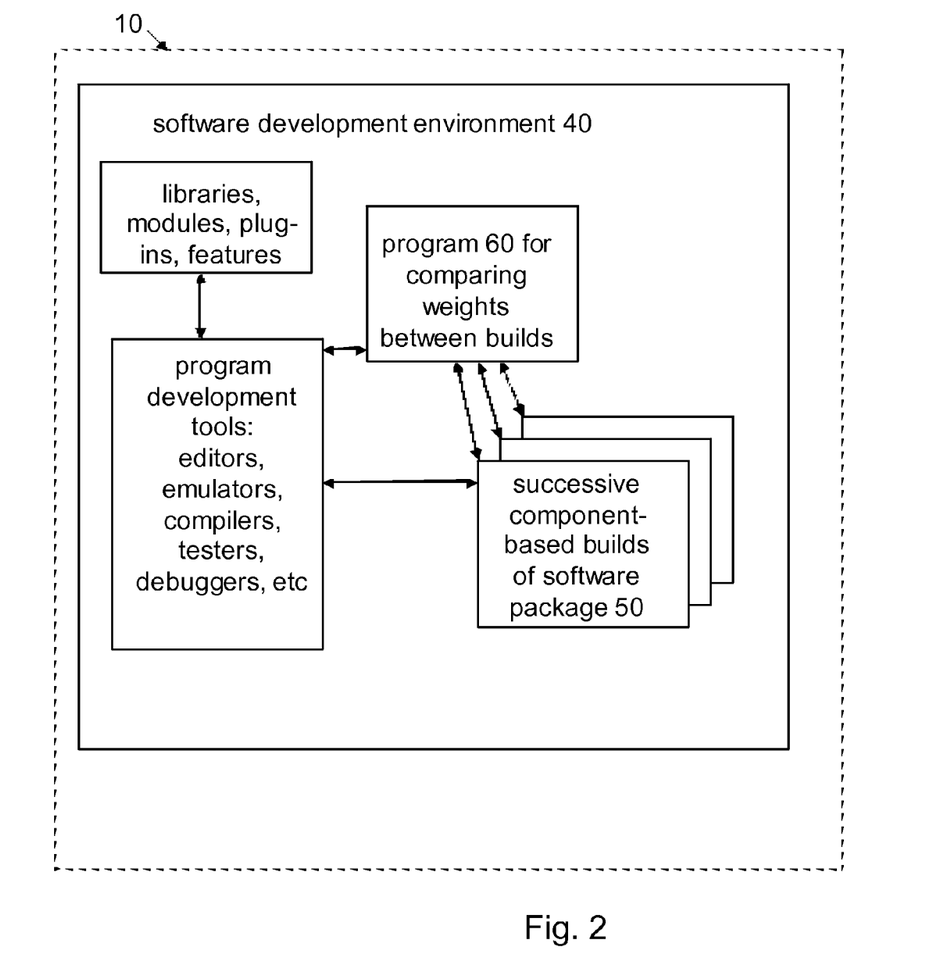
FIG. 2 is a block diagram of an example of a software development environment operable on the computer system of FIG. 1, the environment including an embodiment of the program for comparing component weights between builds.

A software development environment typically will be used for implementation of a system 60 for comparing component weights between builds. Preferably the software development environment will be capable of building a component-based build. Any such suitable software development environment may operate on computer system 10 or on any computing platform capable of supporting such an environment. Components may be of any type, including those used in component-based builds, such as, modules or sets of modules in libraries, plug-ins or features or other wrappers for multiple plug-ins, or any other segments of computer code as suited to a particular implementation.

As the software developer makes a change or changes to one or more individual components of the software package, the changes may be quantified for their effect on the installations of the software package in terms of the costs, practicality, and other measures of usability of the package. These effects may be considered as a result of a weight of the component, which weight tends to change as the component is changed.

The weight may include one or more pieces of data such as a count of other components required by the individual component, an install size, a runtime memory usage, a depth of a dependency tree, a component license type, a component category for memory location (e.g., where the component will be installed, such as in user space v. kernel space), a component code type (such as Java v. native code), and/or other data relating to the component and its relationship with other components within the build and/or with other software that may interact with the software package. The data may be provided as component metadata within a build manifest. The data may be determined at build time, such as for install size. Other data useful in calculation of component weight may include steps required for installing, such as unzipping files or setting system properties, and/or itemization of artifacts within a component, such as zip files, jar files, and executables. Such data may be stored in any suitable manner in the build manifest or elsewhere. For example, each license type, each category for memory location, and/or each code type may be a bit within a bit mask.

The data used in the weight for a component may vary depending on the specific implementation of the system, program, or method. Generally speaking, the weight is a measure of what resources are requested in order for the component to function as planned.

For example, the component may be dependent on other components because the component, while running, may call or otherwise invoke the other components, and thus the other components should be included in the build. In such a case, the weight may be the total number of components required to satisfy all direct dependencies of the component and may also include all indirect dependencies. As an example, a depended-upon other component may in turn depend on yet other components, which may further include dependencies.

Figure 3A:
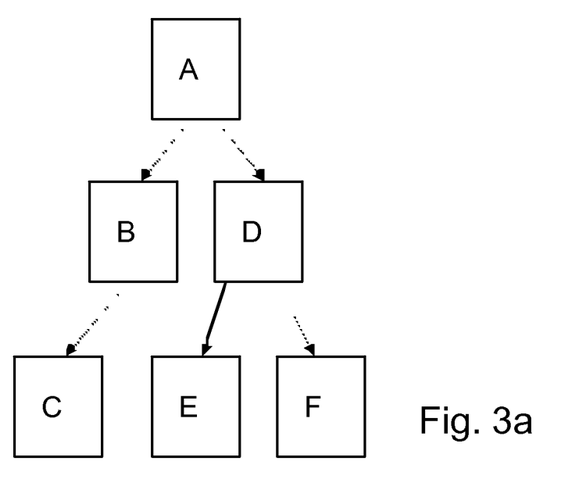
FIGS. 3a and 3b are charts showing a dependency tree for components in a directed graph.
Figure 3B:
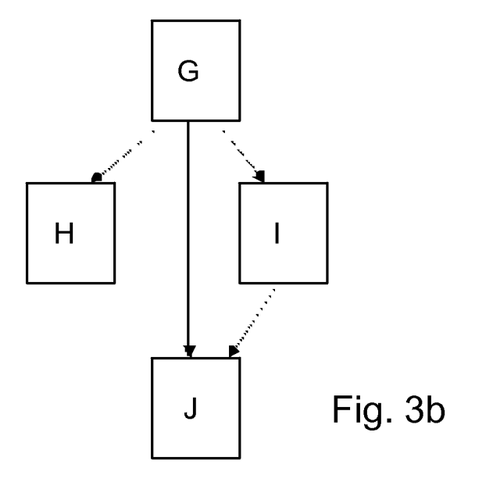

A directed graph may be used in determining the dependencies of one or more individual components. Example graphs are shown in FIGS. 3a and 3b. A directed graph, generally speaking, is a set of vertices and edges interconnecting the vertices. Each vertex, or node, may represent one component. The directed graph typically indicates the directions of the dependencies. For example, each of the edges may be an ordered pair of two vertices indicating a directional relationship between the vertices. Each node may also include other information such as install size and/or license information relating to the represented component. Each node may be a data object with each of those objects having an associated method for getting the desired data, such as install size, run time memory, or license type.

Typically, such directed graph for one individual component will include all the other components upon which the individual component at issue depends, directly or indirectly. The directed graph in FIG. 3a as an example of component dependencies for an individual component, A, and other components, B, C, D, and E, would contain the information in a set of ordered pairs: e.g., A,B; B,C; A,D; D,E; D, F. In this example, the ordered pairs would indicate that A depends directly on B and D, and indirectly on C (through B's dependence on C), and indirectly on E and F (through D's dependence on E and F).

This example, using only a count of the components in the dependency tree, gives a weight for A of six, because it depends on the presence of six (including A itself) components. Similarly, in the directed graph of FIG. 3b, component G may be seen to have a weight of four. If A, or any of B through F, were changed to depend on additional components, then the weight of A will change accordingly. However, calculating the weight change may require analysis of all dependencies of all components. So, adding one dependency to one component that does not in turn depend on any other components increases the weight by only one. However, adding a dependency to a component with its own dependencies on components that may or may not already be within the directed graph requires analysis of those dependencies to calculate the increase in the weight of A. For example, if B were changed to depend also on G (FIG. 3b), then the weight of A would increase by four. In typical commercial software builds, dozens or hundreds of components may be nodes in the directed graph with correspondingly large numbers of edges interconnecting the nodes.

Using such directed graphs and/or other measures of weight may provide for a determination of the cumulative weight change when changing, or adding or removing, a component to an overall grouping of functionality, as will be discussed more fully below, along with the capacity for providing a notification if the weight of the component changes to an extent exceeding some threshold.

Thus, the weight relating to component dependency may be a count of other components required by the individual component, and/or a depth of a dependency tree. The weight may further incorporate, in its counting of other components, such things as the install sizes and/or the runtime memory usages by the other components and/or other data as suited to a particular implementation.

For example, the component weight may be an effective component weight that includes a basic component weight, such as the component's install size, plus the install size for all dependency components. For example a component with an install size of 12 KB that depends on components with install sizes of 15 KB and 24 KB, may have an effective component weight of 51 KB.

Figure 4:
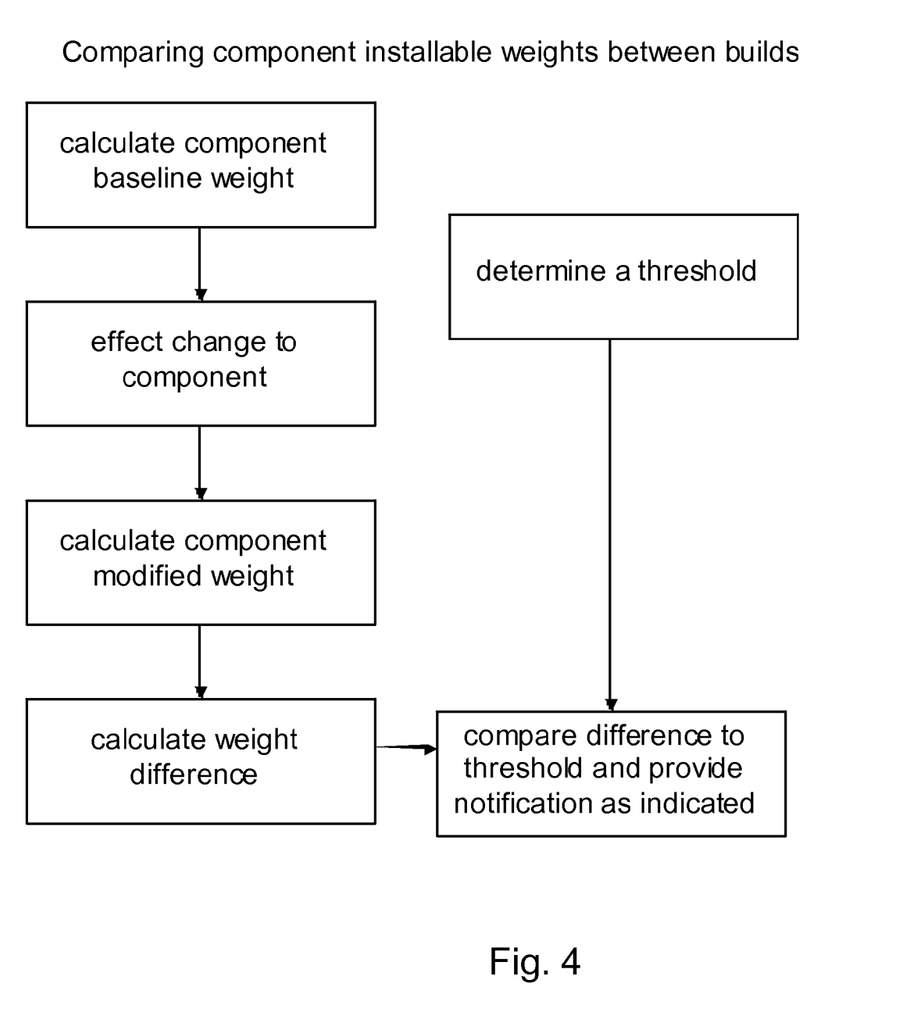
FIG. 4 is a flow chart of an example of a method that may be performed in the environment of FIG. 2 for comparing component weights between builds.

As shown in FIG. 4, comparing component installable weights between builds typically involves first determining the weights of each build. That is, the program may first calculate a baseline weight of the individual component prior to a change, using the directed graph or other suitable techniques. Then a change to the individual component or another related component may be effected, typically on the software development computer. The program may then calculate a modified weight of the individual component after the change.

The program may determine, either beforehand or during or after the change, a threshold for a difference between the baseline weight and the modified weight of the individual component. The threshold may be determined in any process suitable to the particular implementation. For example, the threshold may be a percentage of the baseline weight, or the threshold may be a fixed threshold received from the software development environment.

The program may then calculate the difference between the baseline weight and the modified weight of the individual component and compare that to the threshold. A notification may be provided, on the software development computer or elsewhere, if the difference exceeds the threshold. Generally speaking, the threshold is determined by any suitable means so that significant impacts of changes in component dependencies or other weights may be detected, and may be a fixed value or a value relative to a weight. The threshold may be relative to baseline component weight or relative to the modified baseline weight, or it could be relative to a system-based value, such as total memory available in the target system or some other target system restriction, such as license type.

These steps may include the calculation of baseline weight and modified weight using only a single type of data for the weight. Alternatively or additionally, the weight calculations may include calculating multiple baseline weights and multiple modified weights, one for each type of data, typically along with corresponding thresholds for each type of data. The notification may then specify which of the weights has exceeded its corresponding threshold. Additionally, more than one type of data may be combined in a single baseline-weight/modified-weight/threshold/difference combination as suited to a particular implementation of the program.

The steps of calculating the baseline weight and calculating the modified weight may each include identifying an individual build size for the individual component and a build size for each other component on which the individual component depends. The determinations of the threshold and differences will correspond accordingly. The steps of calculating the baseline weight and calculating the modified weight may further include calculating a total build size for the individual component based on the individual build size and the build sizes for each of the other components on which the individual component depends.

The steps of calculating the baseline weight and calculating the modified weight may each include identifying an individual runtime memory usage for the individual component and a runtime memory usage for each other component on which the individual component depends. The steps of calculating the baseline weight and calculating the modified weight may further include calculating a total runtime memory usage for the individual component based on the individual runtime memory usage and the runtime memory usages for each of the other components on which the individual component depends.

The steps of calculating the baseline weight and calculating the modified weight may each include identifying data relating to a component license type, a component category for memory location, and/or a component code type. In such cases, the threshold for the difference between the baseline weight and the modified weight of the individual component may be zero. In this example, any change in the weight for these data types will result in a notification.

Consideration of an aggregate weight, such as an overall weight, of multiple specified components may be used, for example where the developer is responsible for multiple components or where the components are often used together. The aggregate weight for multiple specified components may be the sum of the effective weights for the specified components with any duplicate dependencies subtracted.

In relation to this, the program may further quantify changes in a set of components including the individual component by alternatively or additionally calculating an aggregate baseline weight for the set of components prior to a change of at least one component in the set. In such embodiments, where change is effected on at least one component in the set, the program may calculate an aggregate modified weight for the set of components after the change. The program may further determine an aggregate threshold for an aggregate difference between the aggregate baseline weight and the aggregate modified weight of the set of components. The program may calculate the aggregate difference between the aggregate baseline weight and the aggregate modified weight of the set of components. The program may then provide, preferably on the software development computer, a notification if the aggregate difference exceeds the aggregate threshold.

The individual component may be a top-level component, e.g., the main component on the client and/or the main component on the server. Ordinarily, the individual component is some component included within the build.

The program operating within the software development environment may include a set of tools for carrying out changes to components and quantifying the effect of such changes. For example, this may include a first tool configured to calculate a baseline weight of the individual component prior to a change and to calculate a modified weight of the individual component after the change; a second tool configured to determine a threshold for a difference between the baseline weight and the modified weight of the individual component; a third tool within the software development environment configured to calculate the difference between the baseline weight and the modified weight of the individual component; and/or a fourth tool configured to provide a notification if the difference exceeds the threshold. The program may be provided as a product on a computer usable medium as computer usable code embodied on the medium.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for quantifying changes in an individual component among a plurality of components, wherein the components are incorporated in a build in a software development environment and wherein at least a portion of the software development environment and the components are resident on a software development computer, the method comprising using a processor of the software development computer for:

calculating at least two baseline weights of the individual component, prior to a change, one for each of at least two of data selected from the group consisting of:
        a count of other components, within the plurality of components, that are required by the individual component;
        an install size;
        a runtime memory usage;
        a depth of a dependency tree;
        a component license type;
        a component category for memory location; and
        a component code type;
    effecting, on the software development computer, the change to the individual component;
    calculating at least two modified weights of the individual component, after the change, one for each of the at least two of the data selected from the group for the baseline weights;
    determining at least two thresholds that each represent a difference between the baseline weight and the modified weight of the individual component, one for each of the at least two of the data selected from the group for the baseline weights;
    calculating the differences between the baseline weight and the modified weight of the individual component for each of the at least two of the data selected from the group for the baseline weights; and
    providing on the software development computer a notification if any difference exceeds any of the thresholds for any of the at least two of the data selected from the group for the baseline weights.

2. The method of claim 1, wherein calculating the at least two baseline weights, calculating the at least two modified weights, determining the at least two thresholds, and calculating the differences includes combining at least two of the data selected from the group.

3. The method of claim 1, wherein calculating the at least two baseline weights and calculating the at least two modified weights each include identifying an individual build size for the individual component and a build size for each other component, within the plurality of components, that is required by the individual component.

4. The method of claim 3, wherein calculating the at least two baseline weights and calculating the at least two modified weights further include calculating a total build size for the individual component based on the individual build size and the build sizes for each of the other components that is required by the individual component.

5. The method of claim 1, wherein calculating the at least two baseline weights and calculating the at least two modified weights each include identifying an individual runtime memory usage for the individual component and a runtime memory usage for each other component, within the plurality of components, that is required by the individual component.

6. The method of claim 5, wherein calculating the at least two baseline weights and calculating the at least two modified weights further include calculating a total runtime memory usage for the individual component as a sum of the individual runtime memory usage and the runtime memory usages for each of the other components that is required by the individual component.

7. The method of claim 1, wherein each of the at least two thresholds is zero when the data selected comprises any of the component license type, the component category for memory location, and the component code type.

8. The method of claim 1, wherein determining the at least two thresholds includes calculating each of the thresholds as a percentage of respective ones of the at least two baseline weights.

9. The method of claim 1, wherein each of the at least two thresholds is a fixed value received from the software development environment.

10. A computer-implemented method for use in quantifying changes in a set of components among a plurality of components, wherein the components are incorporated in a build in a software development environment and wherein at least a portion of the software development environment and the components are resident on a software development computer, the method comprising using a processor of the software development computer for:

calculating an aggregate baseline weight of the set of components prior to a change to at least one component in the set;
    effecting, on the software development computer, the change to the at least one component in the set;
    calculating an aggregate modified weight of the set of components after the change;
    determining an aggregate threshold for an aggregate difference between the aggregate baseline weight and the aggregate modified weight of the set of components;
    calculating the aggregate difference between the aggregate baseline weight and the aggregate modified weight of the set of components; and
    providing on the software development computer a notification if the aggregate difference exceeds the aggregate threshold.

11. A computer system, comprising:
a processor of the computer system;
a software development environment operable on the processor of the computer system;
a plurality of components accessible within the software development environment on the computer system, the plurality of components including an individual component depending upon at least one other component in the plurality of components; and
instructions which are executable, using the processor, to implement functions comprising:
    calculating at least two baseline weights of the individual component prior to a change, one for each of at least two of data selected from the group consisting of:
        a count of other components, within the plurality of components, that are required by the individual component;
        an install size;
        a runtime memory usage;
        a depth of a dependency tree;
        a component license type;
        a component category for memory location; and
        a component code type;
    effecting, on the computer system, the change to the individual component;

calculating at least two modified weights of the individual component after the change, one for each of the at least two of the data selected from the group for the baseline weights;

determining at least two thresholds that each represent a difference between the baseline weight and the modified weight of the individual component, one for each of the at least two of the data selected from the group for the baseline weights;

calculating differences between the baseline weight and the modified weight of the individual component for each of the at least two of the data selected from the group for the baseline weights; and providing a notification on the computer system if any difference exceeds any of the thresholds for any of the at least two of the data selected from the group for the baseline weights.

12. A computer program product for developing software on a computer system, the software including an individual component among a plurality of components, the computer program product comprising:

a non-transitory computer readable storage medium having computer readable code embodied therewith, the computer readable code comprising computer readable program code for:

calculating at least two baseline weights of the individual component, prior to a change, one for each of at least two of data selected from the group consisting of:

a count of other components, within the plurality of components, that are required by the individual component;

an install size;

a runtime memory usage;

a depth of a dependency tree;

a component license type;

a component category for memory location; and a component code type;

effecting the change to the individual component;

calculating at least two modified weights of the individual component, after the change, one for each of the at least two of the data selected from the group for the baseline weights;

at least two thresholds that each represent a difference between the baseline weight and the modified weight of the individual component, one for each of the at least two of the data selected from the group for the baseline weights;

calculating the differences between the baseline weight and the modified weight of the individual component for each of the at least two of the data selected from the group for the baseline weights;

providing a notification on the computer system if any difference exceeds any of the thresholds for any of the at least two of the data selected from the group for the baseline weights.

* * * * *